United States Patent [19]
Marsh

[11] Patent Number: 6,142,721
[45] Date of Patent: *Nov. 7, 2000

[54] APPARATUS FOR AND METHOD OF BINDING A BOOK

[76] Inventor: Jeffrey D. Marsh, 7 County Rd., Foristell, Mo. 63348

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,156

[22] Filed: Jan. 30, 1998

[51] Int. Cl.$^7$ .............................. B42B 5/00; B24C 11/00
[52] U.S. Cl. .................. 412/1; 412/6; 412/5; 412/4; 412/17; 281/21; 364/468
[58] Field of Search ................ 412/1–8, 11–13, 412/17, 5–7, 33, 37, 39; 281/21

[56] References Cited

U.S. PATENT DOCUMENTS

| | | | |
|---|---|---|---|
| 3,532,363 | 10/1970 | Abildgaard et al. | 281/29 |
| 3,570,350 | 3/1971 | Fogg | 83/404 |
| 3,575,501 | 4/1971 | Rosenberg | 399/306 |
| 3,888,150 | 6/1975 | Stroud et al. | 83/368 |
| 3,925,126 | 12/1975 | Leatherman et al. | 156/73.6 |
| 3,956,053 | 5/1976 | Staats | 156/272.2 |
| 3,957,287 | 5/1976 | Hall et al. | 281/21.1 |
| 3,973,787 | 8/1976 | Staats et al. | 281/21.1 |
| 4,075,726 | 2/1978 | Korsgaard | 412/4 |
| 4,149,288 | 4/1979 | Sendor et al. | |
| 4,184,218 | 1/1980 | Hawkes | |
| 4,289,330 | 9/1981 | Wiermanski | 281/21.1 |
| 4,296,294 | 10/1981 | Beckert et al. | 219/765 |
| 4,367,061 | 1/1983 | Wilholm | 412/3 |
| 4,420,282 | 12/1983 | Axelrod | 412/4 |
| 4,496,617 | 1/1985 | Parker | 428/55 |
| 4,715,758 | 12/1987 | Stobb | 412/8 |
| 4,863,191 | 9/1989 | Termanis | 281/29 |
| 4,923,351 | 5/1990 | Nishikawa | 412/6 |
| 5,006,396 | 4/1991 | Van Bortel et al. | 428/189 |
| 5,026,445 | 6/1991 | Mainolfi et al. | |
| 5,137,409 | 8/1992 | Honnegger | 412/8 |
| 5,340,155 | 8/1994 | Podosek | 281/29 |
| 5,350,268 | 9/1994 | Miller | |
| 5,465,213 | 11/1995 | Ross | |
| 5,496,253 | 3/1996 | Snellman et al. | 493/320 |
| 5,536,044 | 7/1996 | Luhman et al. | 281/40 |
| 5,647,715 | 7/1997 | Stolz | 412/1 |
| 5,658,408 | 8/1997 | Frantz et al. | |
| 5,724,075 | 3/1998 | Smith | 347/2 |
| 5,868,539 | 2/1999 | Rathert | 412/5 |
| 5,871,323 | 2/1999 | Clark | 412/4 |

FOREIGN PATENT DOCUMENTS

0390734A3  3/1990  Germany .

Primary Examiner—Willmon Fridie, Jr.
Assistant Examiner—Alisa L. Thurston
Attorney, Agent, or Firm—Polster, Lieder, Woodruff & Lucchesi

[57] ABSTRACT

A system for the perfect binding of a book block (14) within a soft paper cover is disclosed in which the center portion (18) of the cover is sized relative to the thickness of the book to be bound. An activatable adhesive is applied to the inner surface of the center portion of the cover. The book block is inserted into the cover such that the spine (S) of the book block is generally in register with the adhesive. The cover is forcibly compressed onto the book block by pressing members (60a, 60b). An ultrasonic horn (66) is brought into forcible working engagement with the outer surface of the center portion of the cover and is rendered resonant so as to transmit ultrasonic energy to the adhesive sufficient to melt the adhesive and to force the adhesive into the edges of the pages of the book block along the spine and to force the pages of the book block into the adhesive along the center portion of the cove such that upon the cessation of the ultrasonic energy the adhesive hardens substantially instantaneously thus binding the cover to the book block. A method of binding a book is also disclosed.

28 Claims, 6 Drawing Sheets

APPARATUS FOR AND METHOD OF BINDING A BOOK

CROSS-REFERENCE TO RELATED APPLICATIONS

Not applicable.

STATEMENT REGARDING FEDREALLY SPONSORED RESEARCH OR DEVELOPEMNT

Not applicable

BACKGROUND OF THE INVENTION

This invention relates to apparatus for and to a method of binding a book, and more particularly to apparatus for and to a method of binding a single copy of a printed on demand using a binding system referred to as perfect binding.

With the advent of on demand book printing or publishing systems, as disclosed in U.S. Pat. No. 5,465,213, single copies of any one of a multiplicity of books can be printed on demand in a matter of a few minutes. However, to make the on demand printed book copy attractive to consumers, it must be bound in a fashion that is similar to binding systems now in use for binding traditionally printed books available from publishers. Such binding systems for on demand printed books must have the same "feel" to the reader and must be of equal durability. Oftentimes, bookstores sell better quality paperbound books referred to as "trade" paperback books and these trade paperback books are bound in soft paper covers (as distinguished from hard cover books). It has been a long-standing problem in the on demand book publishing field to readily bind on demand printed books with a binding system that is as acceptable to the reader as perfect bound books, but which can accommodate a relatively wide range of book thickness (i.e., a wide range of the number of pages in the book to be bound), which has supplies requiring little or no maintenance during periods of non-use of the on demand book publishing system, which permanently binds the pages to one another and to the cover, which is immediately ready for use, which does not require overly complicated and expensive binding equipment, which does not require undue maintenance by the user of the on demand book publishing system, and which is economical to use.

In on demand book publishing systems, a variety of book binding systems have been used to bind the pages of a book being printed to the corresponding cover for that which is also printed on demand with the pages for the book. However, these prior book binding systems for on demand printing have been complicated and expensive, require that hot melt adhesives be maintained at temperature for long periods of time, require that the binding of the book be held in a compressed state for overly long periods of time to allow the pages to be permanently bound together and to the cover. In addition, it has been found that for a period of about 24 hours from binding, the pages of such on demand printed books will often come undone from the other pages and from the cover and thus it has been desirable to allow the bound books to sit for 24 hours or so prior to opening the pages of the book and particularly before bending the binding back on itself so as to aid in holding the book open to the page being read, as is common for readers to do with trade paperback books.

Reference may be made to such prior art patents as U.S. Pat. Nos. 4,149,288, 4,184,218, 4,923,351 and 5,350,268 which may be relevant to the present invention.

SUMMARY OF THE INVENTION

Among the several objects of this invention may be noted the provision of a book binding system which may be readily used with on demand book publishing system to bind a single copy of a book which has been printed on demand in a short amount of time;

The provision of such a book binding system which results in a book similar in appearance, feel, and usability to a perfect bound trade paperback book;

The provision of such a book binding system which can readily accommodate a wide range in the number of pages in a book;

The provision of such a book binding system which does not require a supply of hot melt glue held in a liquid state (or other high maintenance adhesive) for binding;

The provision of such a book binding system in which a book bound by the system is ready for use immediately upon removal from the book binding system;

The provision of such a book binding system in which supplies may be readily added to the on demand book publishing system and which does not require special training for the operator to use or to normally service the book binding system;

The provision of such a book binding system which does not create fumes or odors which must be vented to the exterior of a building in which an on demand book publishing system is housed;

The provision of such a book binding system which may be idle for an extended period of time, which is substantially instantaneously ready for use, and which does not require and undue warm-up period or the like before it is ready for use;

The provision of such a book publishing system which is quiet in operation;

The provision of such a book publishing system which has a long service life, which is of comparatively simple, rugged, and economical construction as compared with conventional book binding systems now in use with on demand book publishing systems, which requires an acceptable amount of maintenance, and which is reliable in operation.

Briefly stated, a book binding system of the present invention comprises a scoring mechanism for pre-forming the cover of the book to be bound so as to conform to the thickness of the book to be bound and to assure that the cover lays flat in respect to the book's inner pages. An adhesive applicator applies an adhesive to the inner face of the cover between the score lines. A binding fixture receives the scored cover with the inner faces of the cover facing outwardly for receiving the pages of the book to be bound. A conveyor inserts one edge of the pages to be bound into the cover between the score lines. At least one movable pressing element compresses the cover and the book pages proximate the spine of the book pages to be bound. A sonic vibratory member engages the outer surface of the cover along the spine of the book and applies vibratory energy thereto so as to activate said adhesive thereby to adhere the pages to one another and to adhere the pages to the cover along the spine of the book. A method of binding the book is also disclosed.

BRIEF DESCRIPTION OF THE DRAWINGS

Corresponding reference characters indicate corresponding parts throughout the several view of the present invention.

DESCRIPTION OF PREFERRED EMBODIMENTS

Figure 1:
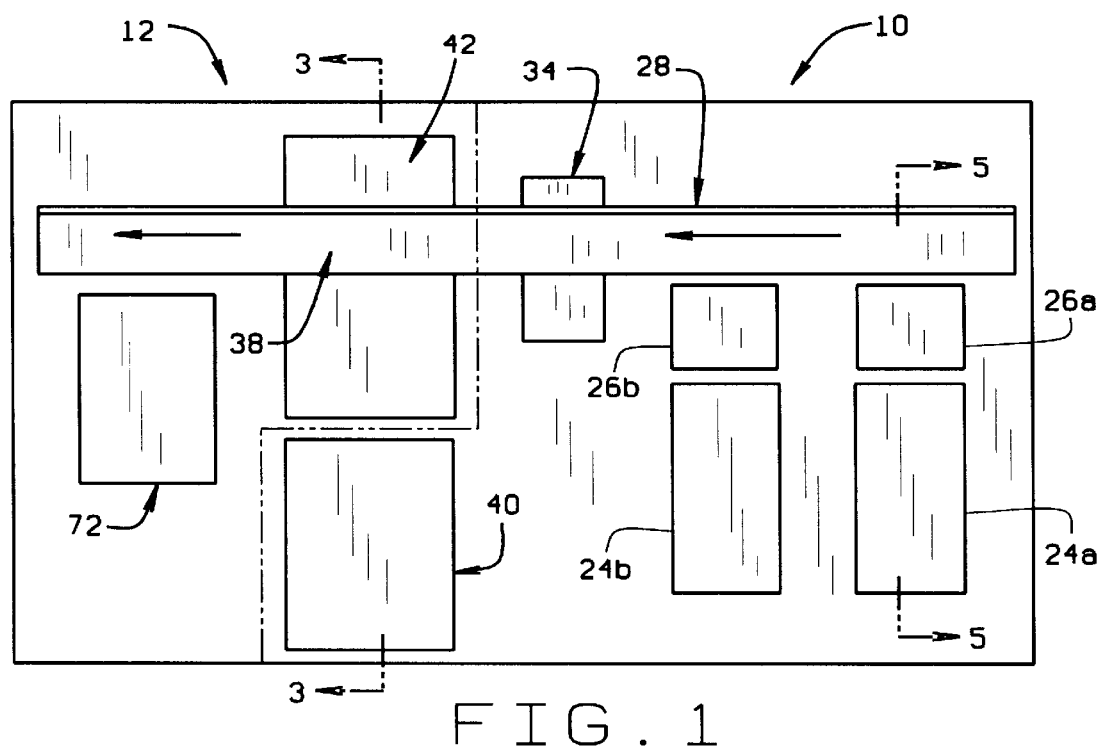
FIG. 1 is a semi-diagrammatic plan view of an on demand book publishing system incorporating a book binding system of the present invention in line with such on demand book publishing system illustrating the major components of the on demand publishing system and of the binding system, with a dotted line separating the components of the publishing system from the components of the binding system of the present invention.
Figure 7:
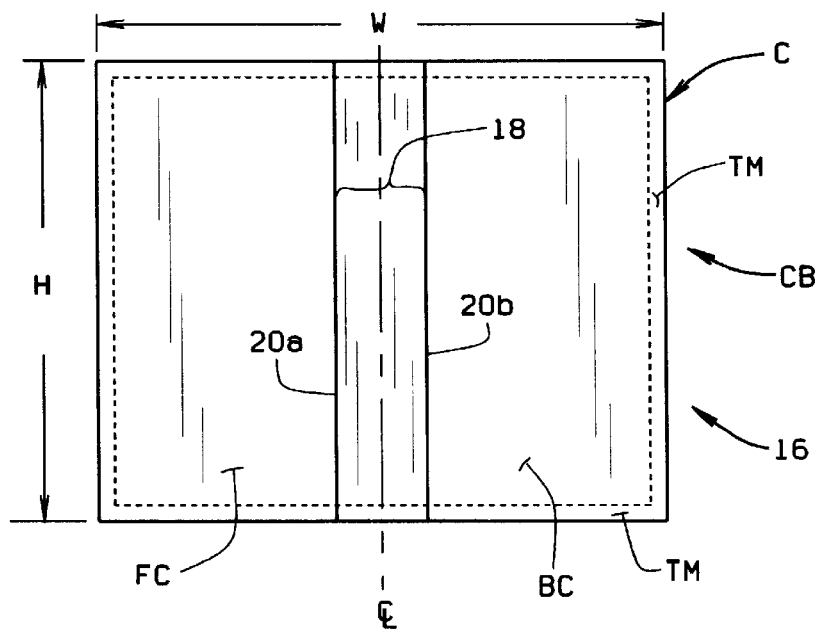
FIG. 7 is a top plan view of the inner face of a cover blank preferably printed by the on demand book publishing system to correspond to the book being published and illustrating certain areas of the cover.

Referring now to the drawings, and particularly to FIG. 1, an on demand book publishing system is depicted in its entirety by reference character 10. A book binding system of the present invention, as indicated in its entirety at 12, "(to the left of the dashed line, as shown in FIG. 1)". Is in line with the on demand book publishing system to receive a book block 14 (see FIG. 4) and a soft cover 16 (as shown in FIG. 7) printed by the book publishing system along with the pages P of the book block and with the cover corresponding to the book block. In other words, as shown in FIG. 1, the binding system 12 of the present invention is in line with the book publishing system 10 such that as the book block 14 and the cover 16 are printed by the book publishing system 12, the book block and the cover corresponding to the book being printed are automatically conveyed to the book binding system 12 and are bound in a short time (e.g., in a matter of seconds) to form a perfect bound book in a single operation. Upon completion of the binding operation, the bound book is ejected from the binding system in a form ready for use or for sale without having to wait for the binding to cure or to set. Such books bound by the book binding system 12 are generally similar to a conventional "trade paperback" book. As shown in FIG. 1, a dashed line separates the main components of on demand publishing system 10 from the main components of binding system 12 of the present invention. It will be appreciated that while the binding system of the present invention is shown installed in line with an on demand printing system, the binding system of this invention may also be a stand alone binder and need not be in line with a printing system.

On demand book publishing system 10 is preferably of the type described in U.S. Pat. No. 5,465,213, which is herein incorporated by reference. Alternatively, a book publishing system, such as is commercially available from Xerox Corporation of Rochester, N.Y., and commercially sold under the DocuTech® or Xerox Documents On Demand (XDOD), may be used to print books to be bound by book binding system 12. However, within the broader aspects of this invention, it will be appreciated that the binding system 12 of the present invention need not be installed in line with any book publishing system, but instead may be a stand alone binding system which may receive and bind books or other multi-page packets (i.e. documents without covers), printed by any process, including standard offset printing operations. Further, the book binding system of the present invention need not be limited to binding a single copy of a book, but in use may be effectively and economically used to bind short runs of the same book and may be adapted for large runs.

Figure 4:
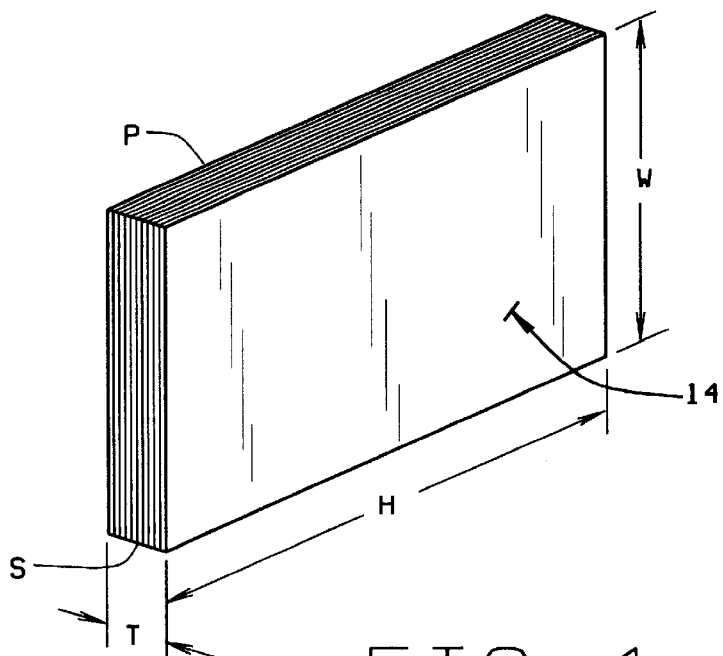
FIG. 4 is a perspective view of a book block to be bound by the binding system of the present invention illustrating the height, width and thickness of the book block.

Referring to FIG. 4, book block 14 comprises a plurality of printed pages P. The book block has a height H, a width W, and a thickness T. One edge of the book block which extends along the height of the book block is referred to as the spine S of the book block. The pages of book block 14 are preferably printed by the book publishing system 12 (or by other suitable means) and constitute the pages of the book to be bound. The number of pages P and thus the thickness T of the book block may vary between a minimum number of pages (or thickness) and a maximum number of pages (or maximum thickness) within a predetermined range. For example, the range of pages that can be effectively bound by the binding system and method of this invention may range from a minimum number of pages of about 25 pages to a maximum of about 1,000 or more pages, depending on the size of the cover blank C being used and the weight of the paper on which the book pages P are printed. For example, if the weight of paper on which pages P are printed is 500 pages/inches (ppi), the thickness range of such books will range from about 0.050 inches to about 2.000 inches. It will be understood however, that the binding system of this invention may be used to bind even thicker books. As shown in FIG. 4, spine S has a generally flat outer surface of a width that corresponds generally to the thickness T of book block 14.

Preferably, but not necessarily, the pages constituting the book block 14 are of a predetermined length L and height H (e.g., 6 inches×9 inches). The number of pages in a typical book bound may be about 300 pages, but this number may vary widely. Further, the type of paper used for the pages of the book block may vary widely, however, a paper known as 60 pound offset bond, has worked well for printing pages P of book block 14 with the binding system and method of this invention. Spine S is the edge of the book block which is bound to the cover of the book.

As shown in FIG. 7, a book cover blank C to be used with the book binding system and method of the present invention is preferably a soft paper cover stock having a thickness substantially thicker and stiffer than pages P of the book block. The cover blank C has a centerline CL located at the center of the cover blank and extends heightwise of the cover. The cover blank C has a front cover FC and a back cover BC and an outer face and an inner face. Typically, printed information or graphics depicting the cover of the book is printed on the front cover FC and on the back cover BC. The inner faces of the cover may or may not have printed information thereon. The graphics and text information printed on the front and back covers are preferably printed by the on demand printing system 10 substantially simultaneously with the printing of pages P, but it will be understood that cover C may be preprinted.

Cover C cover has a center portion or region, as indicated at 18, centered with respect to centerline CL for receiving the spine S of the book block 14 to be bound. In a manner as will be hereinafter disclosed, the width of center region 18 of the cover may vary in accordance with the thickness of the book block 14 to be bound. Cover C wraps around the spine S and around the front and back faces of the book block 14. Center region 18 of cover C is preferably defined by score or fold lines 20a, 20b extending heightwise of cover C on opposite sides of centerline CL with these score or fold lines spaced apart a distance generally corresponding to the thickness T of book block 14 to be bound. These score or fold lines not only define the center region 18, but they insure that upon binding of the book block 14 within the cover that the front and back cover of cover C will lie against the front and back of the book block and remain in a normally closed position such that the front and back cover of the book will not spring out away from the pages of the book. The forming of such score lines and thus defining center portion 18 is referred to as conditioning the cover for the book being printed. Cover C may be of a variety of stock materials, but covers of coated, 80 pound offset stock has worked well with the system and method of this invention.

As noted, it is preferable (but not necessary) that the book binding system of the present invention be in line with an on demand book publishing system 10 so as to received the book block 14 and the cover 16 printed by the on demand book publishing system such that the printing and the binding of a book is a seamless, single operation. Thus, for purposes of this disclosure, the book binding system 12 of this invention will hereinafter be described in conjunction with such an on demand book publishing system 12. However, it will be appreciated that within the broader aspects of this invention, the binding system may be used without being in line with any book publishing or printing system and may be used to bind any book block 14 printed by any means.

Figure 2:
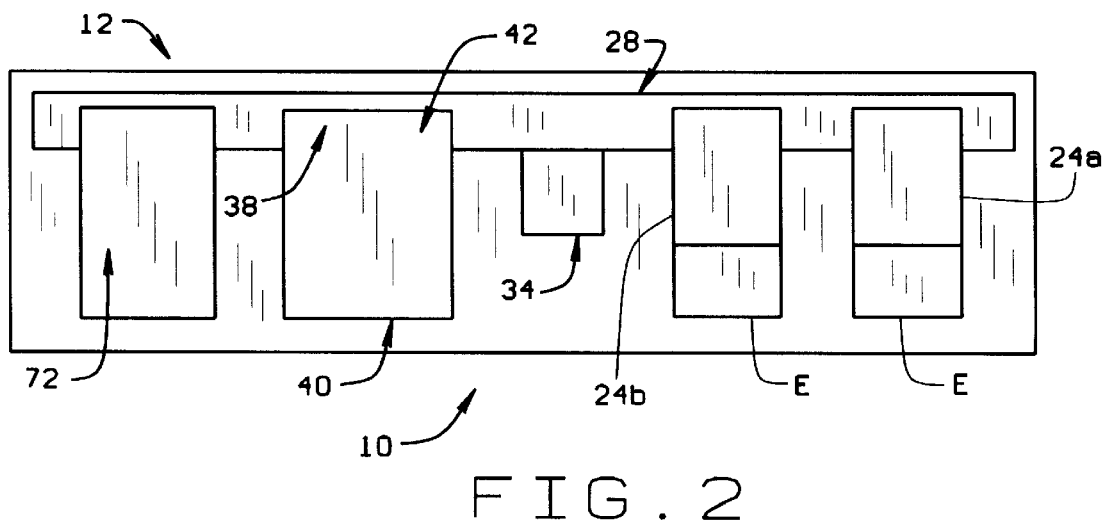
FIG. 2 is a side elevational view of FIG. 1.
Figure 5:
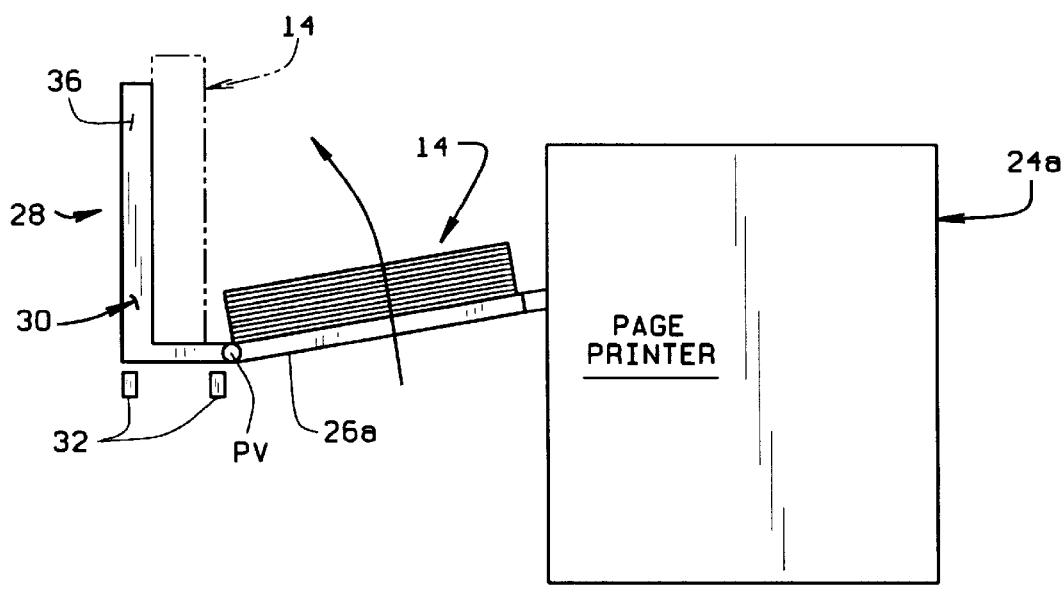
FIG. 5 is a cross sectional view taken along line 5—5 of FIG. 1 illustrating a black and white book printer of the on demand book publishing system which stacks printed pages on an output tray which the printed pages stacked on the tray are rotated to a generally vertical position against a fixed vertical fence of a horizontal conveyor which in turn transports the book pages constituting the book block to a binding station within the binding system of the present invention for being bound within a cover.

As shown in FIGS. 1, 2 and 5 and as further described in the above-noted U.S. Pat. No. 5,465,213, an on demand book publishing system 10 may employ one or more black and white page printers, as indicated at 24a, 24b, to print the pages P of a book selected to be printed. It will be understood that such on demand publishing systems may print a single copy (or multiple copies) of any one of a multiplicity of books stored in a computer memory system. Upon a book being selected and upon a computer COMP of book publishing system (see FIG. 11) being commanded to print the selected book (which may have any thickness within the above-described predetermined range of book thicknesses), the book page images are transmitted from computer COMP to printers 24a, 24b and these printers print pages P. The pages P so printed by each of the printers 24a, 24b are deposited on a respective, generally horizontal bed 26a, 26b as they are fed out of the printers. Upon all of the pages to be printed by a respective printer for the book being printed and deposited on its respective bed 26a or 26b (or both), the bed and the pages are rotated to a generally vertical position, as shown in phantom in FIG. 5, onto a transport conveyor 28. As shown in FIG. 5, bed 26a is pivotally movable about a pivot point PV from a generally horizontal position (as shown in solid lines in FIG. 5) in which it receives pages from its respective page printer 24a to a generally vertical position (as shown in phantom lines in FIG. 5) in which the pages are disposed in a generally vertical position on transport conveyor 28. Bed 26a is pivotally connected to and is movable with a carriage 30 movable which in turn is movable along a horizontal track 32 for transporting the pages P held thereon by bed 26 which serves as a clamp to hold the pages in vertical position on carriage 30 as the carriage moves along track 32 from printer 24a, 24b to a collation station 34 (see FIG. 1) where the pages from printer 24a and from printer 24b are collated in their proper order to form book block 14 such that the pages of the book block correspond to the pages of the book being printed with the pages in proper order. Conveyor carriage 30 has a fixed vertical fence 36 against which pages P are held as the pages are transported from printers 24a, 24b to a collation station 34 and from collation station 34 to a binding station 38 such that the pages P and such the resulting book block 14 are in a known position with respect to conveyor track 34. It will be appreciated that this vertical fence 36 thus serves as a reference allowing book blocks of widely varying thickness to be readily accommodated by the book binding system 12 of the present invention.

Page printers 24a, 24b may be model 4060 printers available from QMS Corporation and capable of printing about 40 sides/minute at a resolution of 600 dots per inch (dpi). Such page printers may be equipped with a suitable supply of paper for printing the pages of the book and the paper is supplied to the printers by a suitable paper elevator E (as shown in FIG. 2). It will be understood that only a single page printer is required. However by having multiple page printers, different groups of pages of the book being printed may be assigned to different page printers and thus the time to print all of the pages of the book may be reduced.

Also, by having multiple page printers, in the event one of the page printers becomes inoperable, the pages to be printed may be printed by the remaining page printers or by a single page printer until the inoperable printer is serviced and is again on line. Of course, if only a single page printer is used, it is not necessary that the pages be collated to form the book block 14.

Figure 3:
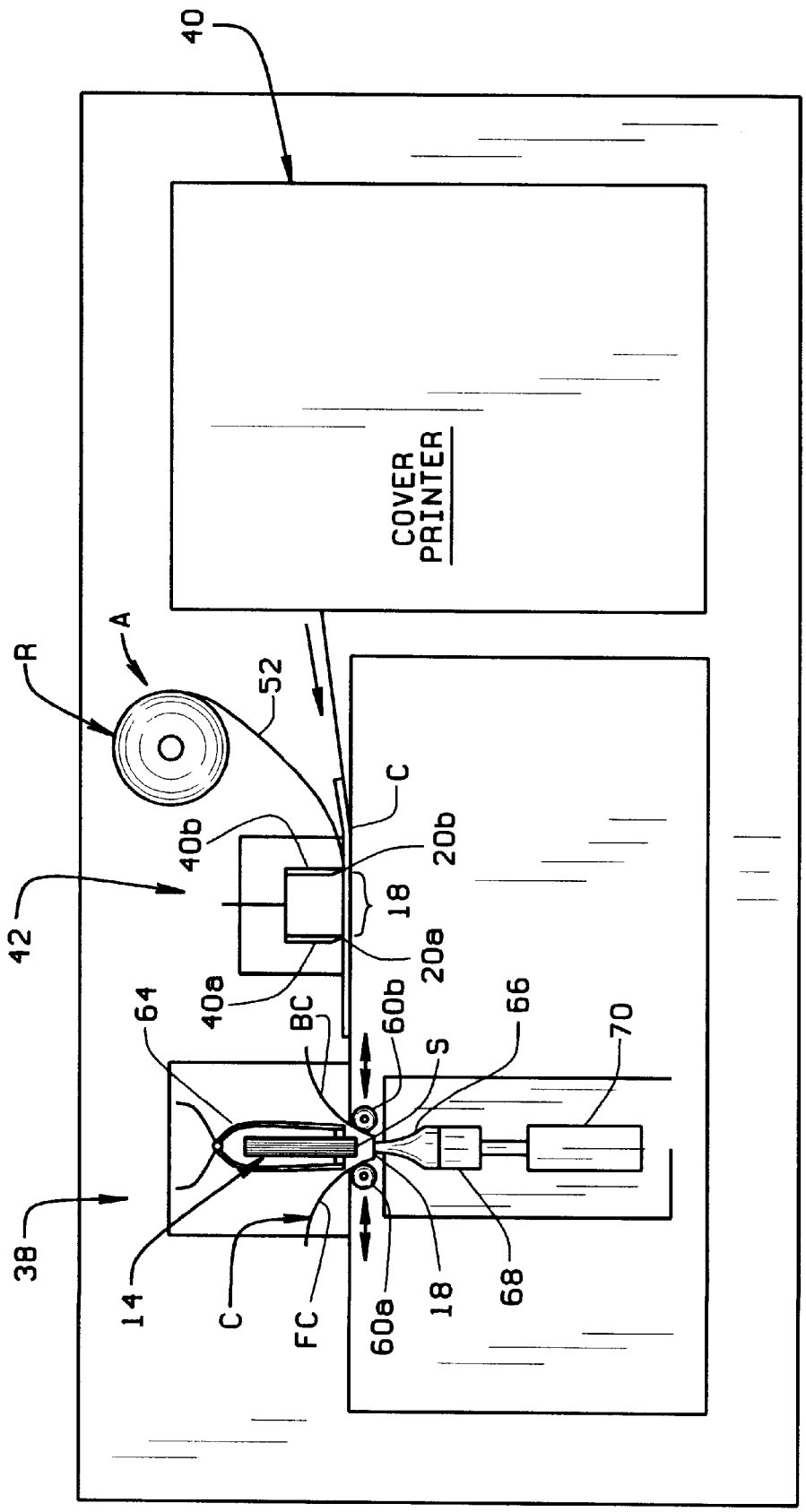
FIG. 3 is a cross sectional view taken along line 3—3 of FIG. 1 illustrating the binding system of the present invention.
Figure 11:
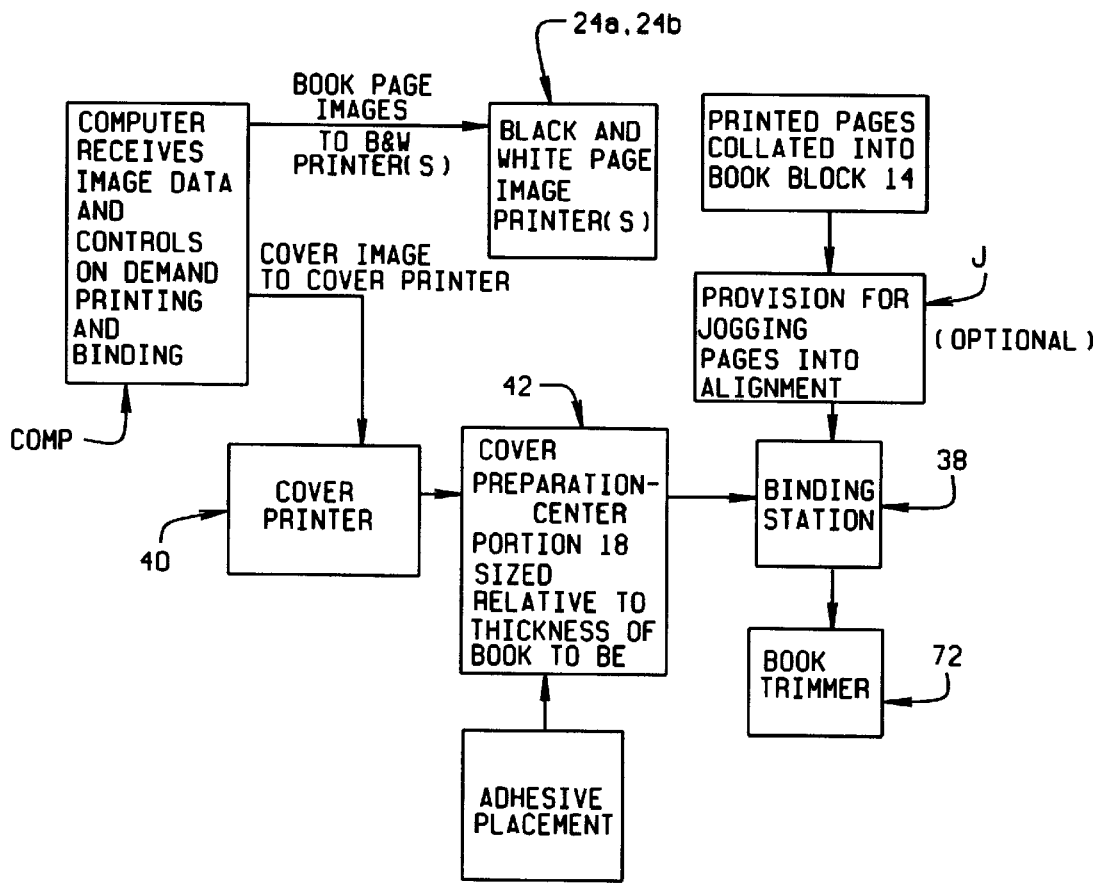
FIG. 11 is a flow chart illustrating how the cover and a book block for a selected book are printed by an on demand book publishing system and how such books are bound in accordance with the method of this invention.

Further, while not shown in FIG. 3, it will be understood that prior to conveying the collated book block 14 into binder 12, it may be desirable that the pages of the book block undergo a jogging operation at an optional jogging station, as indicated a J in FIG. 11, such that the pages of the book block are properly shifted relative to one another such that the edges of the pages along the longitudinal side of the book block forming spine S are in line with one another and such that the edges of the pages at the top and bottom of the book block are substantially aligned with one another.

Book publishing system 10 may also include a cover printer 40 which may, for example, be a suitable color printer for printing a cover blank CB fed into cover printer 40 with text and graphics corresponding to the book being printed substantially simultaneously with black and white printers 24a, 24b printing the pages P of the book. The cover C may have a color front and back and may include any desired graphics or print thereon. For example, cover printer 40 may be a model Phaser 300X commercially available from Tektronix Corporation and capable of printing about 1 sides/minute. It will be understood that cover printer 40 may print cover C while page printers 24a, 24b are printing the pages P of the book being printed.

Cover printer 40 is supplied with blank covers C to be printed. As noted above, such covers may be of any suitable cover stock material, but generally such cover stock is of a soft paper cover stock material which is heavier and thicker than the pages of the book block, but yet is flexible. The cover stock may have a coated finish on one face of the cover for enhancing of the quality of the graphics and text to be printed thereon by cover printer 40. An 80 pound offset cover stock has worked well. Typically, the cover stock from which cover C is printed is oversize. That is, the height and width of the cover blank CB from which cover C corresponding to a book being printed is somewhat larger than the height and width of the book to be bound by the cover. The cover blank is of sufficient size as to form the front cover FC and the back cover BC of the book and to have sufficient material to accommodate any thickness of book within the above-noted predetermined range of book thicknesses.

For example, if the book to be printed has a nominal width of 6 inches and a nominal height of 9 inches, the cover blank CB may initially have a height somewhat greater than 9 inches and a width sufficient to wrap around the spine S, and around the front and back faces of the book block with a trim margin TM along the sides of the cover and along the top and bottom of the cover. By way of example and not by way of limitation, the book cover may have a height of 9.250 inches such that there is an extra trim margin of about 0.125 inches at the top and bottom of the cover. The width of the cover stock is sufficient to accommodate the front cover FC, the back cover BC, and the center portion 18 of the cover with a suitable extra margin at the edges of the cover. In addition, the width of the cover C must be sufficient to for a center portion 18 sufficient to accommodate a book of the maximum thickness or number of pages in the range of book thicknesses to be accommodated by the book publishing system of this invention. For example, if the finished size of the bound book is to be 6.000×9.000 inches, the cover would have a height of 9.000 inches+the trim margin TM of 0.125 inches at the top and bottom margins of the cover. Thus, the cover blank CB would be 9.250 inches tall. The width of the cover blank would be the width of the front and back covers FC and BC+the maximum width of the center portion 18+the trim margins TM at the edges of the front and back cover. If the maximum thickness of book to be bound within the above-noted range of book thicknesses is 750 pages and if the paper weight is 500 pages/inch (ppi), the maximum width of the center portion 18 is 750 pages/500 ppi=1.500 inches. If the standard size book to be bound is 6.000×9.000, and if the maximum thickness of the books to be bound within such a cover blank is 1.5000 inches (i.e., 750 pages on paper having a weight of 500 ppi), the cover blank CB for such a book, adding a minimum trim margin TM of 0.125 inches at each side of the cover blank, the width W (maximum dimension) of cover blank CB (as shown in FIG. 7) would measure approximately 6.000 (for the front cover FC)+6.000 (for the back cover BC)+1.500 inches (for the maximum width of the center portion 18)+0.250 inches (for the trim margin at each side edge of the front and back cover), and the height H of the cover blank (which corresponds to the height dimension of the book being bound) would measure approximately 9.000 inches (for the height of the book)+2×(0.125) inches for the trim margins TM at the top and bottom of the book. That is, the overall size of the cover blank CB would be 13.250 inches×9.250 inches. Of course, if a book having a fewer number of pages is to be bound, the center portion 18 would be less and more of the width of the cover would have to be trimmed from the side edges of the cover.

Upon computer COMP commanding that a selected book be printed, the computer sends information corresponding to the number of pages (and thus the thickness of the corresponding book block 14 for the book being printed) to cover printer 40, and the cover prints print the printed material corresponding to the book being printed on the front and back covers FC and BC of a cover blank CB in relation to the centerline CL of the cover such that the center portion 18 of the cover being printed is of a width which corresponds to the thickness of the book to be bound therein and such that the printed information on the front and back faces of the cover is in proper relation to the edges of the center portion (i.e., in proper relation to score lines 20a, 20b when the printed cover is wrapped around its corresponding book block. In this manner, the center portion 18 of the cover is centered on the spine of the book block and the printed information on the front and back covers of the cover are in proper relation to the spine of the book. Of course, for books which are thinner than the maximum thickness of a book which may be accommodated by the book binding system, the portion of the center portion 18 not used must be trimmed from the cover along with the normal trim margin TM at the longitudinal sides of the book. For example, if the book to be bound has 300 pages, the width of the center portion 18 would be 300 pages/500 ppi=0.600 inches, and the amount of material to be trimmed from the cover at each side edge would be the nominal trim margin TM of 0.125 inches+(1.500 inches−0.600 inches)/2 or 0.450 inches= 0.525 inches.

While the method of binding of the present invention has been described as using a cover blank CB of sufficient length to accommodate a wide range of book thickness such that for books having a thickness less than the maximum thickness such that such excess cover thickness is trimmed from the cover along with a minimum trim margin TM in a subsequent trimming operation (as will be hereinafter described), the binding system and method of this invention need not employ such a generic cover and the cover may be sized in relation to a particular thickness of the book being bound such that the above-noted trim margins and such that a trim operation for trimming such excess cover stock or for trimming such trim margins is not necessary.

Figure 6:
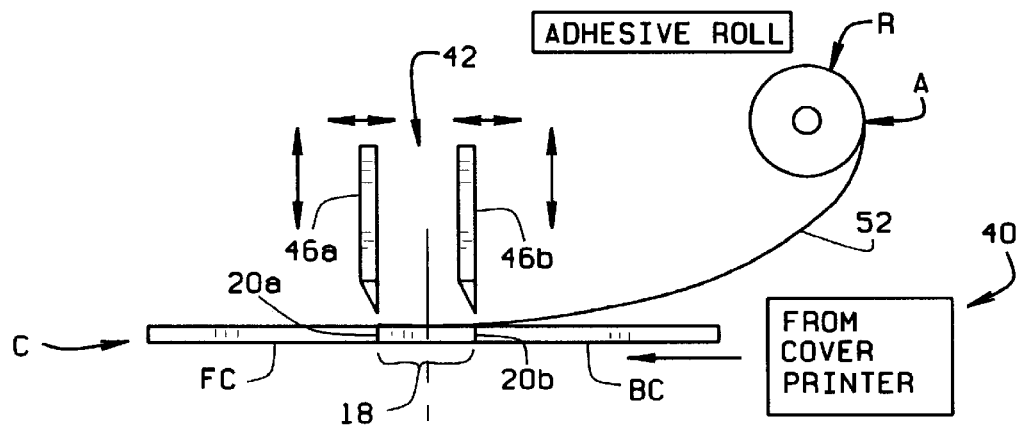
FIG. 6 is an enlarged view of a portion of FIG. 3 illustrating a system for cutting a strip of adhesive from a roll in relation to the thickness of the book block to be bound within the cover, a system for conditioning (scoring) the center portion of the cover to form a pocket for receiving the strip of adhesive and the spine of the book block, with the score lines constituting pre-fold lines which insure folding of the cover therealong such that the front and back covers of the bound book will lay flat on the outer pages of the book block bound within the cover.

Upon cover C being printed in cover printer 40, the printed cover is conveyed to a cover conditioning station, as indicated at 42, where the cover is conditioned to receive the book block 14 to be bound. Preferably (but not necessarily), cover C is conditioned by forming score lines 20a, 20b on the cover on opposite sides of the cover centerline CL with the score or fold lines 20a, 20b spaced equidistantly from the cover centerline with the spacing of the score lines corresponding to the width of the spine S of the book block 14 to be bound in the cover C. The score lines 20a, 20b are preferably formed by respective scoring blades 46a, 46b (as shown in FIG. 6) which are in horizontal direction (as shown by the horizontal arrows in FIG. 6) relative to the cover centerline CL to form the score lines in the appropriate position on the cover, depending on the thickness of the book block to be bound. The scoring blades 46a, 46b have a narrow knife edge extending along the full height H of the cover which, upon being forcibly pressed downwardly onto the cover which is supported on a fixed bed, the scoring blades form corresponding score or fold lines 20a, 20b in the cover such that the cover will readily fold along the score lines. In this manner, the cover is, in effect, overfolded along the score lines such that upon wrapping the cover around the book block and upon binding the book block within the cover, the front cover FC and the back cover BC of cover C are biased (due to the overfolded score lines) to lie flat on the front and back of the book block. As will be appreciated, this overfolding of the cover insures that the front and back cover remain in their desired closed positions in which they lie flat of the front and back pages of the book and such that the front and back covers do not "spring" open.

While the use of scoring blades 46a, 46b are preferred, it will be understood that within the broader aspects of this invention, any suitable means for forming score or fold lines 20a, 20b may be used. For example, instead of scoring blades, the front cover FC and the back cover BC of cover C may be folded inwardly along fold lines corresponding to the spacing of the score lines. Other methods of scoring (e.g., scoring rollers) will be apparent to those skilled in the art, particularly in application of the binding system and method of the present invention if used in higher volume binding operations where relatively large numbers of books of a uniform thickness are to be bound. It will also be appreciated than instead of requiring two scoring blades 46a, 46b, only one scoring blade may be used held at a fixed position with the cover being accurately indexed with respect to the blade thereby to form score lines 20a, 20b at the desired locations on the cover relative to centerline CL.

As shown in FIG. 6, scoring blades 46a, 46b are independently adjustable in horizontal direction (as shown by the horizontal arrows shown in FIG. 6) so as to correspond to the width of center portion 18 for the book being printed. Further, each of the scoring blades may together or may be operated independently of one another to form score lines 20a, 20b in cover C in the proper position relative to centerline CL to correspond to the width of the center portion being formed.

In accordance with the binding method of the present invention, with cover C having been scored to have score lines 20a, 20b formed on opposite sides of centerline CL so as to correspond to the thickness of the book block 14 to be bound, adhesive A is applied to the inner face of cover C in the region of center portion 18 such that the adhesive is substantially of the width and height of center portion 18. As shown in FIG. 6, adhesive A is shown to be a sheet 52 of a suitable hot melt adhesive which, at room temperature, is readily handled. The sheet adhesive is un-rolled from roll R of adhesive and placed superior to and proximate to the region of center portion 18 of cover C. During the scoring process, the sheet adhesive is trimmed to the desired width and placed on the cover C. The remaining uncut sheet of adhesive is then withdrawn from the working area. Alternatively, the sheet adhesive is un-rolled from a roll R of adhesive and a knife blade cuts a strip of the sheet adhesive from the roll conforming to the width of the spine S of the book block to be bound. It will be understood that the amount of sheet adhesive unrolled past knife to form the adhesive strip is controlled in relation to the number of pages or thickness of the book to be bound such that the strip of adhesive is properly sized to the thickness of the book. It will also be understood that roll R of adhesive has a width corresponding to the standard height of the books to be bound. For example, if the binder of the present invention is to bind books of a variety of thickness, but having a standard height of, for example 9.000 inches, by cutting the strip S to conform to the thickness of the book being bound, the adhesive will accommodate any thickness of book within the above-stated range of thicknesses of books to be bound. In accordance with this invention, a wide variety of activatable adhesives may be used. One such adhesive is a hot melt adhesive similar to that used in glue guns which is formed in sheets and then rolled into rolls. Such adhesive is commercially available from Arrow Fastener Co., Inc., of Saddle Brook, N.J. If needed, one face of sheet 52 may be protected with a paper liner (not shown) treated so as to have a non-stick surface such that the sheet adhesive will not adhere to one another when rolled into roll R. While sheet adhesive, as above described, may be preferred, it will be understood that other types of activatable adhesives may be used. For example, a coating of micro-encapsulated, heat activatable adhesive may be applied to the inner surface of center portion of book cover C by spraying or the like.

Figure 8:
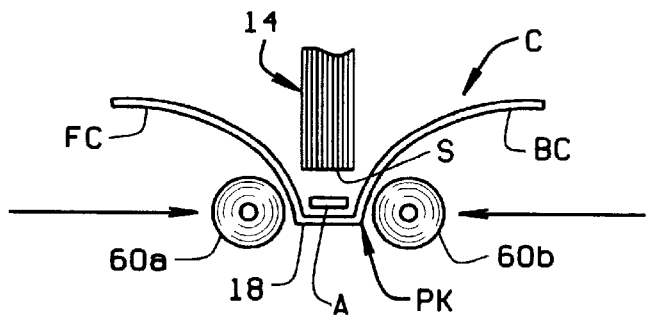
FIG. 8 is a semi-diagrammatic view of a conditioned cover having a strip of activatable adhesive applied to the inner face of the central portion of the cover with the cover disposed between a pair of spaced compression rolls with and with a vertically oriented book block disposed for insertion within the cover with the spine of the book block received within the center portion in register with the adhesive.
Figure 9:
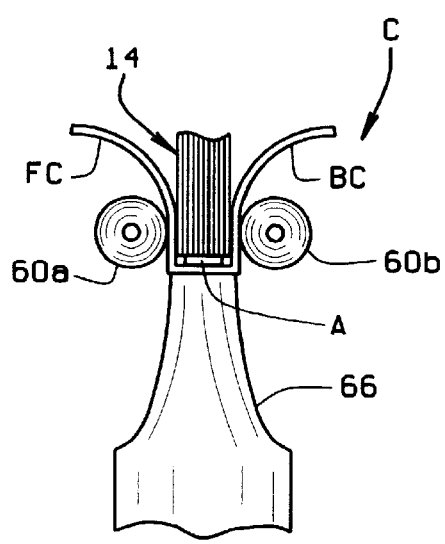
FIG. 9 is a semi-diagrammatic view showing the book block received within the center portion of the cover in register and in contact with the adhesive, with the pressing rolls in pressing engagement with opposite sides of the cover proximate the center portion thereby to tightly compress the cover on the book block adjacent the spine of the book block and further illustrating a sonic horn in working engagement with the exterior of the center portion of the cover such that upon energization of the sonic horn, sonic vibrational energy is transmitted to the cover and the adhesive sufficient to activate (melt) the adhesive and to effect substantially instantaneous bonding of the book block to the cover and of the pages of the book block to one another.
Figure 10:
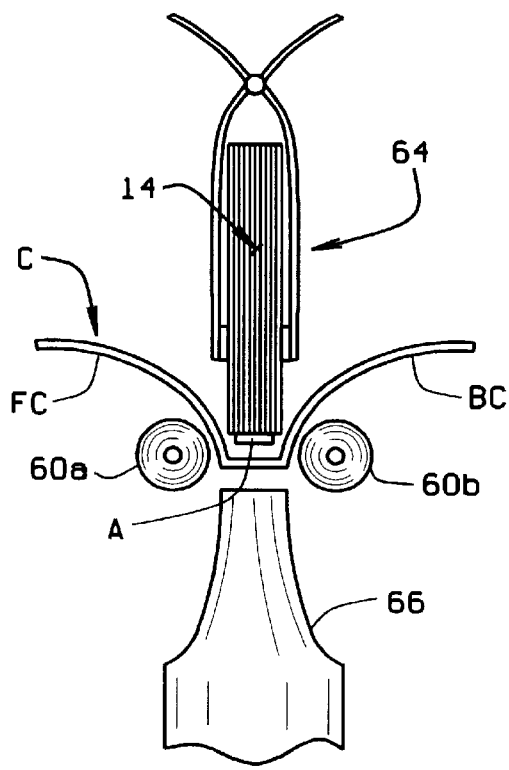
FIG. 10 is a view similar to FIG. 9 further illustrating a clamp which both compresses the pages of the book block proximate the spine as the book block is inserted into the cover and provides the resistance to the pressure and vibrational energy transmitted by the sonic horn.

As shown in FIG. 3, the conditioned cover C is along with the book block 14 are conveyed to a binding station 38 at which the book block is bound within cover C in accordance with the method of the present invention. As shown in FIGS. 3 and 8, the center portion 18 of cover C is forced downwardly between a pair of pressing rollers 60a, 60b by a tool (not shown) movable downwardly so that center portion 18 forms a pocket PK. As shown in FIG. 8, adhesive strip A is disposed on the inner face of center portion 18. The adhesive strip may be placed in the pocket either prior to conveying cover C into binding station 38 or which the cover is in the binding station. The above-noted pocket forming tool is removed and a book block 14 is inserted downwardly into pocket PK, as shown in FIG. 8., such that the spine S of the book block is in engagement with the adhesive strip A and such that the book block tightly or snugly conforms to pocket PK formed in the cover. As shown in FIGS. 3 and 10, the lower margins of the book block 14 adjacent spine S are preferably tightly compressed by means of a clamp 64 as the book block is inserted into the pocket PK of cover C. With the cover so positioned within the cover pocket PK, and preferably while clamp 64 maintains the margin of the book block adjacent spine S under compression, one or both of rollers 60a, 60b are forcibly moved toward one another thereby to compress the cover C firmly against the proximate faces of the book block adjacent spine S and to compress the pages P of the book block tightly together proximate the spine S.

In accordance with this invention, with the cover held tightly against the lower margins of book block 14 and with the spine S of the book block received within the center pocket PK of the cover C, a sonic tool, as indicated at 66, is brought into working contact with the outer face of the center portion 18 of cover C and energized so as to transmit sonic energy to cover C which in turn activates adhesive A. More specifically, sonic tool 66 is a half-wave horn powered by an ultrasonic transducer 68 (see FIG. 3) which in turn is driven by a suitable power supply and control system (not shown). The sonic horn 66 and the ultrasonic transducer 68 are mounted on a suitable hydraulic cylinder 70 such that the cylinder may forcibly move the working surface of the sonic horn into working engagement with the outer surface of center section 18 of cover C. Preferably, horn 66 is of such a length as to extend along the full length of the center portion 18 of the cover. In this manner, sonic energy from transducer 68 is transmitted through horn 66 and into adhesive A on the inside of the center portion. This sonic energy thus activates (i.e., substantially instantaneously heats) the adhesive to a liquid state, drives the liquid adhesive between the pages of book block 14 along spine S, and forces the liquid adhesive to flow at least a short distance up along the interface between the outer pages of the book block and the inside surfaces of cover C proximate spine S. Upon cessation of the ultrasonic energy, the adhesive will substantially instantaneously freeze into a solid condition this firmly adhering the pages to one another along spine S, adhere the edges of the book block pages P to the inner face of center portion 18 of cover C, and cause the outer face of the book block proximate spine S to bond to the inner face of cover C along the spine. Because the sonic energy is applied only for a short time (e.g., for a fraction of a second), the cover and the pages of the book block in the area of the spine S are not substantially heated, and yet, due to the sonic energy, the liquid adhesive does sufficient penetrate between the pages and into the fibers of the pages to firmly bond the pages. Thus, upon removal of the sonic energy, the liquid adhesive A will substantially instantaneously freeze into sold adhesive thus rendering the bound book ready for use immediately upon the book being ejected or removed from binding station 38. It will be appreciated that with compression rollers 60a, 60b in pressing engagement with cover C and compressing the book block therewithin, the rollers permit limited movement of the book relative to the rollers during energization of ultrasonic tool 66 thus permitting any wrinkles in the cover along the spice of the book to smooth out resulting in a neater appearance of the bound book.

One such ultrasonic system which has worked well for binding book blocks 14 within cover C is one that is commercially available from Branson Ultrasonics Corporation of Danbury, Conn. Such ultrasonic tool was a 920 ma ultrasonic welder which powered the half-wave horn or tool 66 at approximately 20 KHz for about 200 milliseconds with the horn held against the outer face of the center portion 18 of cover C with a contact force of about 20 pounds applied by cylinder 70. A 2:1 booster (not shown) was used between the ultrasonic transducer 68 and horn 66. of the bound book from binding station 38, the bound book may be opened and is ready for use. The power supply and the control system used with this ultrasonic welder were part of the commercial welder.

As noted, sonic tool 66 preferably contacts the full length of the outer surface of cover C along the entire length of center portion 18. However, sonic tool 66 may only contact a portion of center portion 18 at one time and may be moved along the length of the center portion so as to activate the adhesive A along the entire length of the center portion 18. In generally a sonic tool may be energized at frequencies ranging between about 5 KHz and about 40 KHz. Ultrasonic frequencies are generally recognized as frequencies above 20 KHz. Within the broader aspects of this invention, instead of using sonic energy to activate adhesive 6, a vibratory tool using lower frequencies (e.g., in the several hundred Hz. Range) may be used to activate the adhesive. However, a sonic tool, and even more desirably, an ultrasonic tool 66 is preferred.

As previously noted, cover C and the pages constituting the book block 14 are somewhat oversize such that a trimming operation is preferred so as to insure that the height and width of the bound book conform to a desired size and such that the edges of the cover are flush with the pages of the book. In order to trim the bound book, the book is conveyed from binding station 38 to a book trimming station 72, as shown in FIG. 1. One such trimmer may be a programmable trimmer commercially available from The Challenge Machinery Company of Grand Haven, Mich., and known as the DocuTrim trimmer. This trimmer accepts a pre-trimmed book (a book having somewhat oversize pages P constituting book block 14 and an oversize cover blank C, and then sequentially presents each of the sides (most often all three) to a fixed trimming knife which via a guillotine method, cuts off the excess edge of the book. Following trimming, the bound book is ejected from the trimmer and is then ready for use.

As shown in FIG. 11, computer COMP is provided, preferably in on demand book printing system 12. This computer controls operation of the on demand book publishing system 12 and control operation of the binding system 12 of the present invention. Upon a book being selected, the computer retrieves data regarding the selected book from a computer storage repository in the manner described in the above-noted U.S. Pat. No. 5,465,213 which is herein incorporated by reference. This book data not only includes images of the pages P of the book and of the images for cover C, but also contains the number of pages in the selected book. The page images are transmitted to printers 24a, 24b to print pages P and the cover images are transmitted to cover printer 40 to print the cover while the pages P are being printed. The computer COMP determines the thickness of the book to be printed and adjusts the spacing of score blades 40a, 40b accordingly, and commands that the proper width of adhesive sheet 52 be unrolled from adhesive roll R and cut therefrom. Computer COMP also controls operation binding station 38 so as to insert the properly sized cover C between compression rollers 60a, 60b, controls the insertion of book block 14 into the sized cover, controls operation of rollers 60a, 60b to compress cover C onto the lower edge of book block 14, and controls operation of cylinder 70 so as to bring ultrasonic horn 66 into forced engagement with the outer surface of cover C along the spine of the book with a desired force, and controls energization and de-energization of ultrasonic transducer 68 to effect the transmission of ultrasonic energy through cover C so as to melt adhesive A and to force the adhesive into the edges of book pages P along spine S, to force the spine into adhesive A, and to cause at least some of the adhesive to flow around the edges of the book block thereby to adhere the inner face of cover C to the outer face of the book block proximate spine S. Computer COMP also controls the conveying mechanisms within book printer 12 and within binder 14 so as to transport the printed pages P, book block 14, cover C, and the finished (bound) book from the apparatus.

In operation, the binding system 12 of the present invention receives a book block 14 and a conditioned cover C having fold or score lines 20a, 20b formed thereon in relation to cover centerline CL spaced from one another so as to receive the spine S of the book block. A strip of a suitable adhesive A is placed on the inner face of center portion 18 of cover C. The spine S of book block 14 is brought into register with the inner face of center portion 18 and into engagement with adhesive strip applied thereto. Preferably, the book block is tightly clamped or compressed along the spine of the book block. With the book block 14 received in the cover, as shown in FIG. 10, rollers 60a, 60b forcibly compress the cover C onto the outer faces of the book block adjacent spine S. A sonic tool 66 is rendered resonant (i.e., energized by its power supply at its resonant frequency) and is moved into working engagement contact with the outer face of cover C along the length of center portion 18 of cover C to activate (heat) adhesive A thereby to force the activated (liquid) adhesive into the space between adjacent pages P of the book block along spine S, to force liquid adhesive into the space between the inner face of the cover along the outer margins of the book block along the spine of the book on both sides of the book block, and to force the edges of the pages in the spine of the book into the adhesive between the spine of the book and the inner face of the center portion 18 of the cover C. In this manner, good penetration of the adhesive into all spaces between the pages (thus insuring that each page of the book block is properly adhered to each other and to the cover by the adhesive) and insuring that the adhesive is in good adhesive relation between the inner faces of the cover and the book block is insured. Upon de-energization of sonic tool 66, the adhesive will substantially instantaneously cool and solidify thus making the bound book ready for use.

In view of the above, it will be seen that the several objects and features of this invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A system for binding a book, the later comprising a book block having a plurality of paper pages stacked together to form the pages of the book to be bound, the thickness of said book block ranging between a predetermined minimum number of pages and a predetermined maximum number of pages, and a paper cover adapted to wrap around the back, one edge, and the front of said book block, said one edge of said book block constituting the spine of the book block, said spine having a generally flat outer surface of a width corresponding generally to the thickness of said book block, said cover having an outer face, an inner face, and a center portion therebetween with said center portion being in register with said spine of said book block, said system comprising:

an adhesive station for depositing a quantity of adhesive relative to the inner face of said center portion of said cover and to said outer face of said spine of said book block, said adhesive being a heat activatable adhesive which is substantially at room temperature when applied; and a binding station for receiving said cover with the inner face of said cover disposed to receive said book block to be bound; said binding station having, first and second pressing members disposed on the outside of said cover on opposite sides of said cover proximate said spine of said book block with at least one of said pressing members being movable toward said other pressing member for compressing said cover onto said book block proximate said spine; and an ultrasonic member rendered resonant and operatively engageable with the outer surface of said center portion of said cover for applying sonic energy thereto sufficient to activate said adhesive and to effect adhesive engagement between the edges of the pages of the book block constituting said outer surface of said spine and the inner surface of said cover proximate said spine such that upon removal of said sonic energy, said adhesive bonds said pages to one another and to said cover thereby to form a bound book.

2. A book binding system as set forth in claim 1 further comprising a cover processing station for forming the cover so as to conform to the thickness of the book to be bound, said cover processing station having a scoring mechanism which forms a front score line on said cover defining one edge of said of said center portion and a back score line on said cover defining the other edge of said center portion of said cover with the distance between said front and back score lines corresponding generally to the thickness of the spine of said book to be bound.

3. A book binding system as set forth in claim 1 further comprising a trimmer for trimming the bound book block and the cover bound thereto after binding.

4. A book binding system as set forth in claim 1 wherein said adhesive comprises a supply of sheet-like adhesive, and wherein said adhesive station has a cutter for cutting a portion of said sheet adhesive corresponding generally to the thickness of the spine of the book to be bound, said adhesive station further has a mechanism for placing said portion of sheet adhesive into position relative to said spine and relative to said cover.

5. A book binding system as set forth in claim 1 wherein said at least one movable pressing member comprises a roller forcibly movable toward and away from said book spine for compression of said cover and said book block between said pressing members.

6. A book binding system as set forth in claim 5 wherein said pressing members are rollers, said rollers permitting movement of said cover relative to said rollers thereby to allow the cover to conform to said book block substantially without forming of wrinkles in said cover.

7. A book binding system as set forth in claim 1 wherein said ultrasonic member is an ultrasonic horn.

8. A book binding system as set forth in claim 7 wherein said ultrasonic horn is movable toward and away from said center portion of said cover between a retracted position in which said horn is clear of said cover and an operative position in which said horn transmits ultrasonic energy through said cover so as to activate said adhesive.

9. A book binding system as set forth in claim 1 wherein said adhesive is a hot melt adhesive capable of being heated to an activated temperature by said ultrasonic horn.

10. A book binding system as set forth in claim 2 wherein said cover processing station comprises at least one scoring blade which forms said front and back score lines.

11. A book binding system as set forth in claim 10 in which said processing mechanism comprises a pair of scoring blades, said scoring blades being mounted for movement toward and away from the centerline of said cover.

12. A book binding mechanism as set forth in claim 11 further comprising means responsive to the thickness of said book being bound for adjusting said scoring blades relative to said centerline of said cover for forming said scoring lines such that they are spaced apart a distance corresponding to the thickness of the book to be bound.

13. A system for binding a book said book comprising a book block having a plurality of pages and a cover, said book block having a minimum number of pages and a maximum number of pages within a predetermined range of pages thus defining a range of book thicknesses which can be accommodated by said book binding system, said cover having a front face, a back face and a center portion, with the cover adapted to wrap around the front, the back, and at least one edge of said book block with this one edge of said book block constituting the spine of said book block, said binding system comprising:

a carriage for receiving said pages constituting said book block, said carriage holding said pages and transporting said book block along a track;

an adhesive applying mechanism for applying a quantity of adhesive between the inner face of the cover and said spine of said book block;

a binding station located along said track, said binding station receiving said cover with said cover being disposed for receiving said spine of said book block with the latter in register with said center portion of said cover;

said carriage stopping at said binding station with said spine of the book in register with the center portion of said cover and with said adhesive disposed between said spine and said center portion of said cover;

said binding station having first and second pressing members disposed on opposite sides of said cover proximate said spine with at least one of said pressing members being movable toward said other pressing member for pressing said cover onto said book block proximate said spine; and an ultrasonic horn operatively engageable with the outer surface of the center portion of said cover for applying ultrasonic energy thereto sufficient to activate said adhesive such that upon removal of said ultrasonic energy, said adhesive bonds said pages to one another and bonds said pages to said cover thereby to form a bound book.

14. A system as set forth in claims 1 or 13 wherein said adhesive solidifies substantially instantaneously upon de-energization of said vibratory member.

15. A system as set forth in claim 14 wherein said adhesive is a solid at room temperature and melts at elevated temperatures, and wherein ultrasonic horn transmits ultrasonic energy to said cover for effecting the melting of said adhesive with said ultrasonic energy forcing the adhesive into the edge portions of the pages of said book block and onto the portions of said cover proximate said center portion of said cover for insuring the adhesive bonding of said book block with said cover.

16. A system for binding a book block to a soft paper cover to form a perfect bound book, said book block comprising a plurality of paper book pages and having a minimum and a maximum number of pages within a limited range corresponding to a range of thicknesses of books to be bound, said cover having an outer face and an inner face, said book block having one edge thereof referred to as a spine, the length of said spine corresponding generally to the height of said book and the width of said spine corresponding generally to the thickness of said book block, said cover having a center portion on the inner face thereof for receiving said spine of said book block, said system comprising;

means for applying an activatable adhesive between the inner face of said center portion of said cover and said spine of said book block;

means for assembling a book to be bound with said book block in register with said center portion of said cover with said adhesive between said spine and said center portion of said cover;

means for clamping said cover onto said book block proximate said spine; and means for applying ultrasonic energy to the outer face of said center portion of said cover thereby to activate said adhesive into adhesive bonding engagement with the edges of said pages constituting said spine and with said inner face of said cover center portion such that upon removal of said vibratory energy from said cover, said adhesive substantially instantaneously bonds said pages together along said spine and bonds said cover to said spine such that said bound book is formed.

17. A method of binding a book, said book comprising a paper cover and a book block comprising a plurality of paper pages ranging between a minimum and a maximum number of pages within a predetermined range of pages, said book block having a length corresponding generally to the height of the book to be bound and a width corresponding generally to the thickness of the book to be bound, one edge of said book block constituting a spine, said cover having an inner face and an outer face and a center portion for receiving said spine, said method comprising the steps of:

applying an adhesive between said center portion of said inner face of said cover and said spine of said book block;

assembling said book and said cover with said spine of said book block generally in register with said with said center portion of said cover and with said adhesive disposed between said center portion of said cover and said spine of said book block;

forcibly clamping said cover onto said book block proximate said spine;

applying ultrasonic energy to the outer surface of said center portion of said cover to activate said adhesive for adhesive engagement with the edges of said pages forming said spine and with the inner face of said cover such that upon removal of said ultrasonic energy, said adhesive cures thereby to bond said pages to one another and to bond said cover to said book block along said spine.

18. The method of claim 17 further comprising the step of trimming said book block and said cover after binding.

19. The method of claim 17 wherein said step of applying vibratory energy comprises forcibly engaging an ultrasonic horn to the outer surface of said cover along the spine of said book and rendering said ultrasonic horn resonant thereby to transmit ultrasonic energy from said ultrasonic horn through said cover into said adhesive thereby to melt said adhesive.

20. The method of claim 19 further involving the cessation of said ultrasonic energy after a predetermined time so as to effect the substantial instantaneous cooling and solidification of said adhesive.

21. A method of on demand printing and binding a copy of a book, said method comprising the steps of:

selecting one of a multiplicity of books stored in the memory of a computer;

printing the pages of said book on paper stock;

forming a book block comprising a plurality of said pages, said book block having one edge thereof constituting a spine with the width of said spine corresponding generally to the thickness of said book block, said book block having a length corresponding generally to the height of the book to be printed;

printing a paper cover corresponding to said selected book, said cover having an inner face, an outer face, and a center portion;

applying an adhesive between the inner face of said center portion of said cover generally and said spine of said book block;

assembling said book block and said cover with said spine in register with said center portion of said cover with said adhesive disposed therebetween;

compressing said cover onto said book block proximate said spine;

applying ultrasonic energy to the outer surface of said cover center portion thereby to activate said adhesive into adhesive engagement with said pages of said book block along said spine and into adhesive engagement with the inner face of said center portion of said cover; and ceasing the application of said ultrasonic energy thereby to effect the bonding of said pages to one another and to said cover in the region of said spine thereby to form a bound book.

22. The method of claim 21 further comprising printing said cover while said pages comprising said book block are printed.

23. The method of claim 21 wherein said adhesive is a heat activatable adhesive, and wherein said step of applying said sonic energy to melts such adhesive.

24. The method of claim 21 wherein said adhesive is of sheet form, and wherein said step of applying said adhesive comprises cutting at least one width-wise strip from said sheet with the width of said strip corresponding generally to the thickness of the spine of the book to be bound.

25. The method of claim 24 wherein said step of applying said adhesive comprises applying at least one said strip of adhesive between said inner face of said center portion of said cover and said spine of said book block.

26. A system for binding a book, the later comprising a book block comprising a plurality of paper pages stacked together to form the pages of the book to be bound, said book block having a minimum number of pages and a maximum number of pages within a predetermined range of pages, and a paper cover adapted to cover the front, the back and at least one edge of said book block, said one edge of said book block being referred to as the spine of the book block, said cover having an outer face and an inner face, said system comprising:

a binding fixture for receiving the cover with the inner face of the cover disposed for receiving said book block to be bound;

an adhesive applying mechanism for applying adhesive between the inner face of the cover and said spine of said book block;

a carriage for transporting said book block along a path, said carriage positioning said book block relative to said cover such that said spine of said book block to be bound is generally in register with said cover with said adhesive disposed therebetween;

first and second pressing members disposed on opposite sides of said cover proximate said spine with at least one of said pressing members being movable toward said other pressing member for compressing said cover onto said book block proximate said spine; and an ultrasonic horn movable between a retracted position in which it is clear of said cover and an operative position in which it is operative engagement with the outer surface of said center portion of the cover for applying ultrasonic energy thereto sufficient to activate said adhesive such that said activated adhesive is caused to be in adhesive engagement with the edges of the pages of the book block proximate said spine and with said center portion of said cover such that upon removal of said vibratory energy, said adhesive bonds said pages to one another and to said cover along said spine thereby to form a bound book.

27. A system for binding a book as set forth in claim 26 further comprising a book trimming station for trimming the top, bottom and outer edge of said book after said cover has been bound to said cover.

28. A system for perfect binding a book, said book comprising a book block having a plurality of paper pages and a paper cover, said book block having a minimum number of pages and a maximum number of pages within a predetermined range of pages thus defining a range of book thicknesses which can be accommodated by said book binding system, said cover having a front face, a back face and a center portion adapted to respectively wrap around the front, the back, and at least one edge of said book block with this one edge of said book block constituting the spine of said book block, said perfect binding system comprising:

a carriage for receiving said pages constituting said book block, said carriage having a clamp for holding said pages, said carriage transporting said book block along a track;

an adhesive applying station along said track for applying a quantity of adhesive between the inner face of the cover and said spine of said book block;

a binding station located along said track, said binding fixture receiving said cover with said cover being disposed for receiving said spine of said book block with the latter in register with said center portion of said cover;

said carriage with said book block stopping along said track at said binding station with said spine of the book in register with the center portion of said cover and with said adhesive disposed between said spine and said center portion of said cover;

said binding station having first and second pressing members disposed on opposite sides of said cover proximate said spine with at least one of said pressing members being movable toward said other pressing member for pressing said cover onto said book block proximate said spine;

an ultrasonic horn operatively engageable with outer surface of the center portion of said cover at said binding station for applying energy thereto sufficient to activate said adhesive such that upon removal of said energy, said adhesive bonds said pages to one another and bonds said pages to said pages to cover thereby to form a perfect bound book; and a trimming station along said track for trimming at least one edge of said bound book.

* * * * *